(12) United States Patent
Unger et al.

(10) Patent No.: US 11,275,292 B2
(45) Date of Patent: Mar. 15, 2022

(54) VIEWING DEVICE FOR OPTICAL DEVICES

(71) Applicant: Good Sportsman Marketing, LLC, Irving, TX (US)

(72) Inventors: Howard Unger, Henderson, NV (US); Thomas Rucci, Henderson, NV (US); Dillon Douglas, Henderson, NV (US)

(73) Assignee: Good Sportsman Marketing, LLC, Irving, TX (US)

( * ) Notice: Subject to any disclaimer, the term of this patent is extended or adjusted under 35 U.S.C. 154(b) by 0 days.

(21) Appl. No.: 16/658,579

(22) Filed: Oct. 21, 2019

(65) Prior Publication Data

US 2020/0124946 A1     Apr. 23, 2020

Related U.S. Application Data

(60) Provisional application No. 62/749,115, filed on Oct. 22, 2018.

(51) Int. Cl.
*G03B 17/56* (2021.01)
*H04N 5/225* (2006.01)
*G02B 23/00* (2006.01)

(52) U.S. Cl.
CPC ......... *G03B 17/561* (2013.01); *H04N 5/2253* (2013.01); *H04N 5/225251* (2018.08); *G02B 23/00* (2013.01)

(58) Field of Classification Search
CPC .. G03B 17/561; G03B 17/566; G03B 17/565; H04N 5/225251; H04N 5/2253; G02B 23/00

See application file for complete search history.

(56) References Cited

U.S. PATENT DOCUMENTS 4,222,577 A † 9/1980 Giffin
5,918,886 A * 7/1999 Horiuchi ............... B23B 31/008
279/58

(Continued)

FOREIGN PATENT DOCUMENTS

CN          2750332       1/2006
CN        203070015       7/2013

(Continued)

OTHER PUBLICATIONS

OSTEC, MC210-W Wifi Camera Eyepiece, Mar. 2018, p. 5, http://www.ostec.com.cn/product_detail.php?ProId=116&CateId=45.

(Continued)

*Primary Examiner* — Yogesh K Aggarwal
(74) *Attorney, Agent, or Firm* — Lightbulb IP, LLC

(57) ABSTRACT

A viewing device captures one or more images from a spotting scope. A communication device transmits the images to one or more remote display devices. A self-aligning mount allows the viewing device to be automatically aligned with an optical pathway of the spotting scope as it is attached thereto. An adjustment ring allows focusing adjustments to be made to the spotting scope, even after the viewing device is attached. With the viewing device, a user need not physically move to peer through the spotting scope, since images from the spotting scope may be remotely viewed at one or more remote display devices. In addition to spotting scopes, the viewing device may be used with other optical devices, such as binoculars, telescopes, rifle scopes, microscopes, and other optics.

15 Claims, 7 Drawing Sheets

(56) References Cited

U.S. PATENT DOCUMENTS

| | | | |
|---|---|---|---|
| 9,702,661 B2 | 7/2017 | Kremer | |
| 2013/0194435 A1 | 8/2013 | Lupher | |
| 2014/0211020 A1 | 7/2014 | Johns | |
| 2017/0017139 A1 | 1/2017 | Kilic | |
| 2017/0102208 A1* | 4/2017 | Plumb | F41G 1/38 |
| 2017/0346998 A1* | 11/2017 | Rhoden | G03B 17/566 |

FOREIGN PATENT DOCUMENTS

| | | |
|---|---|---|
| CN | 204719326 | 10/2015 |
| CN | 206541064 | 10/2017 |
| CN | 206818972 | 12/2017 |
| KR | 101572858 | 11/2015 |
| WO | WO2014101306 | 7/2014 |
| WO | WO2016100513 | 6/2016 |
| WO | WO2016105880 | 6/2016 |

OTHER PUBLICATIONS

OSTEC, MC500-W 3rd Gen Wifi Camera Eyepiece, Mar. 2018, p. 5, http://www.ostec.com.cn/product_detail.php?ProId=105&CateId=45.

OSTEC, Spotting Scope Eyepiece, Apr. 2015, https://www.pinterest.com/pin/304344887295212334/.

\* cited by examiner
† cited by third party

VIEWING DEVICE FOR OPTICAL DEVICES

CROSS-REFERENCE TO RELATED APPLICATION

This application claims priority to U.S. Provisional Patent Application No. 62/749,115, filed Oct. 22, 2018.

BACKGROUND OF THE INVENTION

1. Field of the Invention

The invention relates to optics and in particular to a viewing device for spotting scopes, rifle scopes, or other optical devices.

2. Related Art

Spotting scopes are commonly used to verify or view the location of bullet impacts at long distances. For example, a spotting scope may be used to score targets that would otherwise be difficult to examine due to the distance to the targets. In addition, the increased magnification provided by a spotting scope allows a user obtain an enhanced view of a target or other area from long distances. An eyepiece is provided to allow users or their spotters to peer through a spotting scope to view their desired target or area.

From the discussion that follows, it will become apparent that the present invention addresses the deficiencies associated with the prior art while providing numerous additional advantages and benefits not contemplated or possible with prior art constructions.

SUMMARY OF THE INVENTION

A viewing device for spotting scopes is disclosed herein. Though described herein with regard to spotting scopes, it will be understood that the viewing device may be attached to and used with a variety of scopes or other optical devices, including but not limited to binoculars, telescopes, rifle scopes, microscopes, and other optics.

The viewing device provides a variety of advantages. As will be described further herein, a self-aligning mount allows the viewing device to automatically align with a spotting scope, namely the lens or other optical elements thereof, when it is secured to the spotting scope. In addition, an adjustment ring of the viewing device allows focusing adjustments to a spotting scope even after the viewing device has been installed on the spotting scope.

One or more imaging devices and communication devices allow images to be captured from a spotting scope and viewed remotely, such as via one or more remote display devices. In such manner, users need not move or reposition themselves to peer through the spotting scope. Moreover, multiple users can view images from a single spotting scope simultaneously.

Various embodiments of the viewing device and methods therefore are disclosed herein. For instance, in one exemplary embodiment, a viewing device for an optical device comprising one or more optical elements is disclosed, with such viewing device comprising an imaging device that captures one or more images and a mount that secures the viewing device to the scope. When secured to the scope by the mount, the imaging device is aligned with the optical elements.

A mount may comprise a plurality of jaws that open and close in a synchronized manner. A mounting control may also be provided. In such embodiments, operation of the mounting control opens or closes the plurality of jaws. The plurality of jaws may move along the tapered supports when opening and closing.

An adjustment control is coupled with at least a portion of the scope such that operation of the adjustment control changes an optical setting of the scope. The adjustment control may be coupled to the at least a portion of the scope via the mount.

The viewing device also includes a communication device transmits the images captured by the imaging device to one or more remote devices. The images are captured by the imaging device using the optical elements. A viewfinder that presents the images at the viewing device may also be included. The viewfinder may be rotatable independent of the imaging device.

In another exemplary embodiment, a viewing device for an optical device comprising one or more optical elements is disclosed, with such viewing device comprising an imaging device that captures one or more images and a mount that secures the viewing device to the scope. When secured to the scope by the mount, the imaging device is aligned with the optical elements.

The mount may comprise a plurality of jaws that open and close in a synchronized manner. A mounting control may be provided to open or close the plurality of jaws via the operation thereof. The plurality of jaws may move along one or more tapered supports when opening and closing.

The viewing device of this embodiment also comprises a rotatable viewfinder and a communication device that transmits the images captured by the imaging device to one or more remote devices. The images are captured by the imaging device using the optical elements.

An adjustment control may be coupled with at least a portion of the scope such that operation of the adjustment control changes an optical setting of the scope. The adjustment control may be coupled to the at least a portion of the scope via the mount. The adjustment control may be a ring that is operated by the rotation thereof.

Various methods are disclosed herein as well. For instance, a method for providing imaging from an optical device comprising one or more optical elements with a viewing device is disclosed, with such method comprising securing a viewing device to the scope with a mount. When the viewing device is secured to the scope, an imaging device of the viewing device is aligned with the optical elements and an adjustment control of the viewing device is coupled with at least a portion of the scope.

An optical setting of the optical device may be adjusted when the adjustment control is operated. In addition, the mount may comprise a plurality of jaws that open and close in a synchronized manner. The plurality of jaws may move along one or more tapered supports when opening and closing.

This exemplary method also includes capturing one or more images with the imaging device and transmitting the images to one or more remote devices with one or more communication devices of the viewing device. The images are captured by the imaging device using the optical elements. The images may be presented at a viewfinder. The viewfinder may be rotatable independent of the imaging device.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION OF THE INVENTION

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

In general, the viewing device herein captures images from a scope, which then may be viewed on an integrated or remote display. Though primarily described herein with regard to scopes, the viewing device may be attached to and used with a variety of scopes or other optics or optical devices, including but not limited to binoculars, telescopes, rifle scopes, and microscopes.

Figure 1:
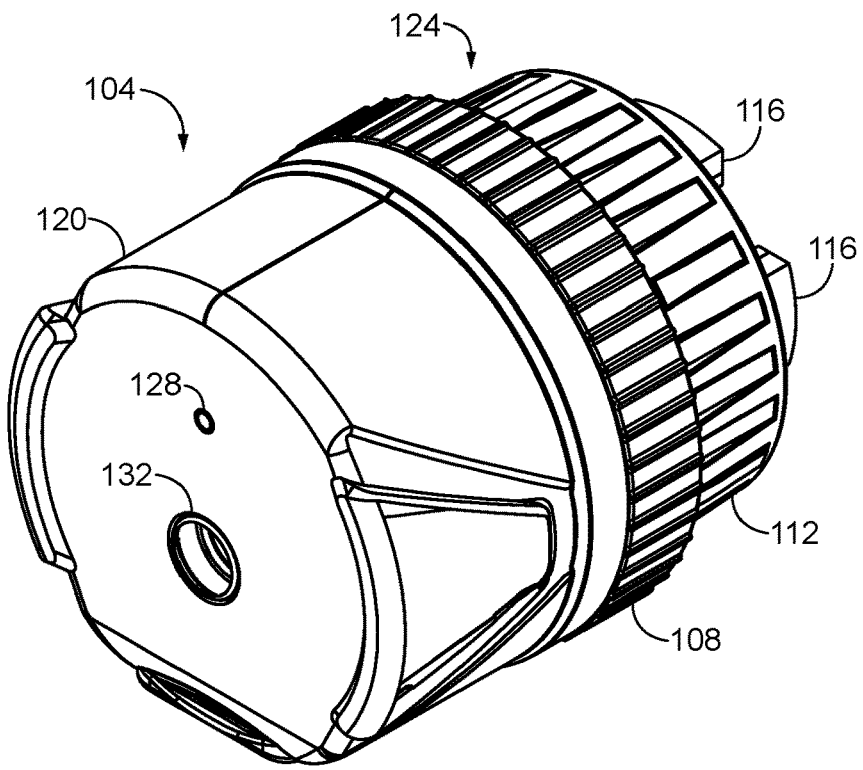
FIG. 1 is a rear perspective view of an exemplary viewing device.

FIG. 1 illustrates a rear perspective view of an exemplary viewing device 104. As can be seen, a viewing device 104 may comprise a housing 120, self-aligning mount 124, and an adjustment ring 108.

A housing 120 may support or enclose one or more components of a viewing device 104. One or more input devices 132 and output devices 128, and, as will be described further below, one or more imaging devices and electronics therefor may be supported by or enclosed within a housing 120.

An output device 128 may be a LED or other light, display, speaker, or other output device that presents information to a user. It is contemplated that battery level, whether the viewing device is on or off, or other system status information may be presented via such output devices.

Various input devices 132 may be provided as well. For example, one or more input devices 132 in the form of one or more buttons, switches, dials, knobs, or other human input devices may be part of a viewing device 104. An input device may be used to turn a viewing device 104 on or off, or configure or control the same. It is noted that one or more microphones may be included, such as to capture audio associated with images or video.

As can be seen, a housing 120 may be a rigid structure at a back end of a viewing device 104. One or more input devices 132, output devices 128, or other components may be externally accessible at a housing 120. A housing 120 dust and water resistant or waterproof such as to protect the viewing device 104 from the elements, environment, or rugged use.

Figure 2:
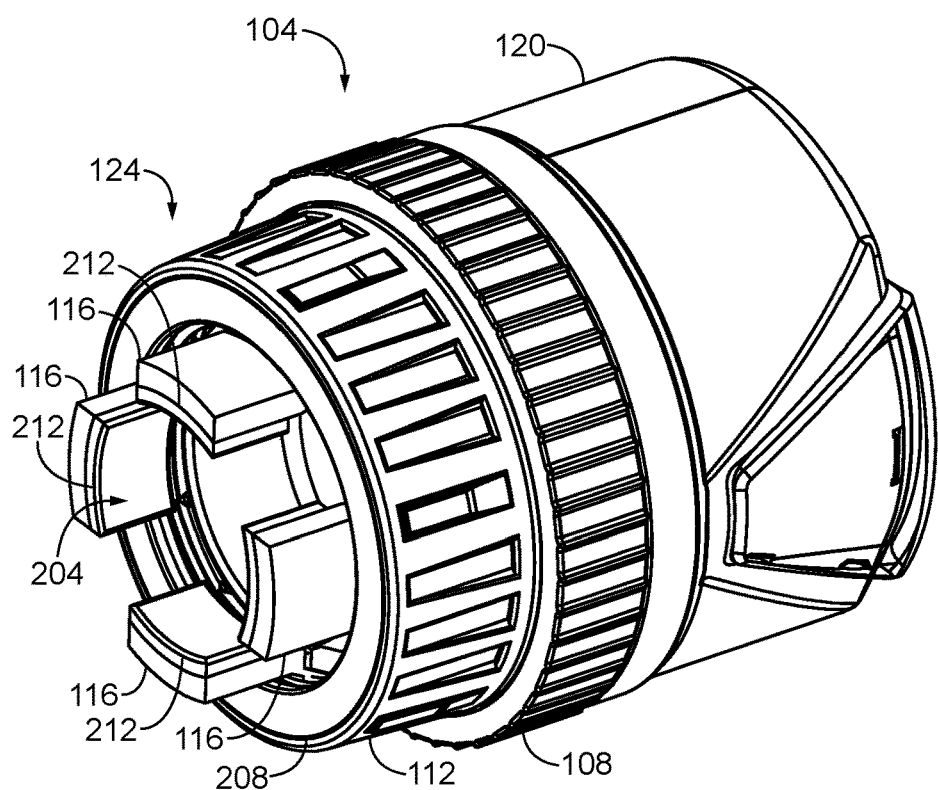
FIG. 2 is a front perspective view of an exemplary viewing device.

Additional details regarding the self-aligning mount 124 are illustrated in the front perspective view of FIG. 2. A self-aligning mount 124 allows a viewing device 104 to be attached to a variety of spotting scopes. In addition, the self-aligning capability of the self-aligning mount 124 helps ensure that the viewing device 104 and the imaging device therein are automatically in alignment with a spotting scope's optical elements when attached thereto. Clear images can be captured from the spotting scope in such manner.

As can be seen, a self-aligning mount 124 may comprise one or more members, such as jaws 116, that may be opened or closed to accommodate various spotting scopes. FIG. 2 illustrates a self-aligning mount 124 comprising two sets of opposing jaws 116 for instance. The jaws 116 of a self-aligning mount 124 may be positioned in an annular arrangement as shown.

In operation, a plurality of jaws 116 may move close toward one another or open away from one another in a synchronized manner. For example, a plurality of jaws 116 may open or close at the same rate. In this manner, a center point between the pair of jaws 116 is maintained equidistant from each jaw. An eyepiece or other portion of a spotting scope can thereby be maintained at a centered position between the pair of jaws 116.

An interior surface of a jaw 116 may optionally comprise a pad 212 to facilitate secure attachment of a viewing device 104 to a spotting scope. A pad 212 may be a rigid or resilient material in one or more embodiments. In addition, a pad 212 may have a textured surface or coating to improve grip.

Movement of jaws 116 may be controlled in various ways, such as by engaging, moving, or otherwise operating a mounting control. As shown, the mounting control is a mounting ring 112 is provided, whereby rotation of the mounting ring in one direction closes the jaws 116, while rotation in an opposite direction opens the jaws. A mounting ring 112 may have one or more ridges, textured surfaces, or the like at an external surface thereof to facilitate rotation. As stated, the rate of movement of individual jaws 116 will typically be the same so as to maintain an equidistance center point between the jaws. It is noted that a limiter 208 may be provided to physically prevent jaws 116 from opening beyond a particular point.

An aperture 204 may be provided at the self-aligning mount 124 to allow light from a spotting scope to pass through the self-aligning mount and into a viewing device 104 where images can be captured by an imaging device, such as a camera, therein. In one or more embodiments, an aperture 204 extends to the housing 120 of a viewing device 104 to permit light, and therefore images, to be captured by an imaging device in the housing.

Figure 3:
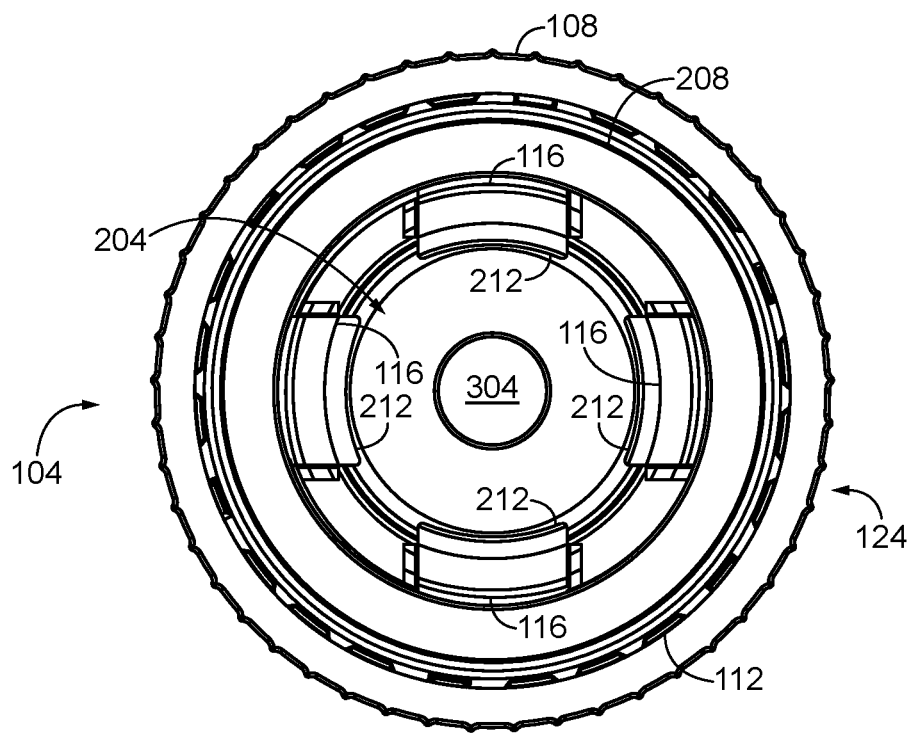
FIG. 3 is a front view of an exemplary viewing device.

FIG. 3 illustrates a front view of an exemplary viewing device 104. As can be seen, the above-described aperture 204 provides a path through which light can pass through a viewing device 104 to its imaging device 304.

Referring back to FIGS. 1 and 2, an adjustment control, such as an adjustment ring 108, will typically be provided to allow adjustment of magnification, focus, or one or more other optical settings of a spotting scope when the viewing device 104 is attached thereto. An adjustment ring 108 may be engaged, manipulated, or otherwise operated to change one or more optical settings. For instance, rotation of an adjustment ring 108 may actuate, rotate, or otherwise adjust a magnification or focusing mechanism of a spotting scope. An adjustment ring 108 may be between a housing 120 and self-aligning mount 124 in one or more embodiments. As can be seen, the adjustment ring 108 may have one or more ridges, one or more textured surfaces, or the like to facilitate the operation thereof.

Figure 4:
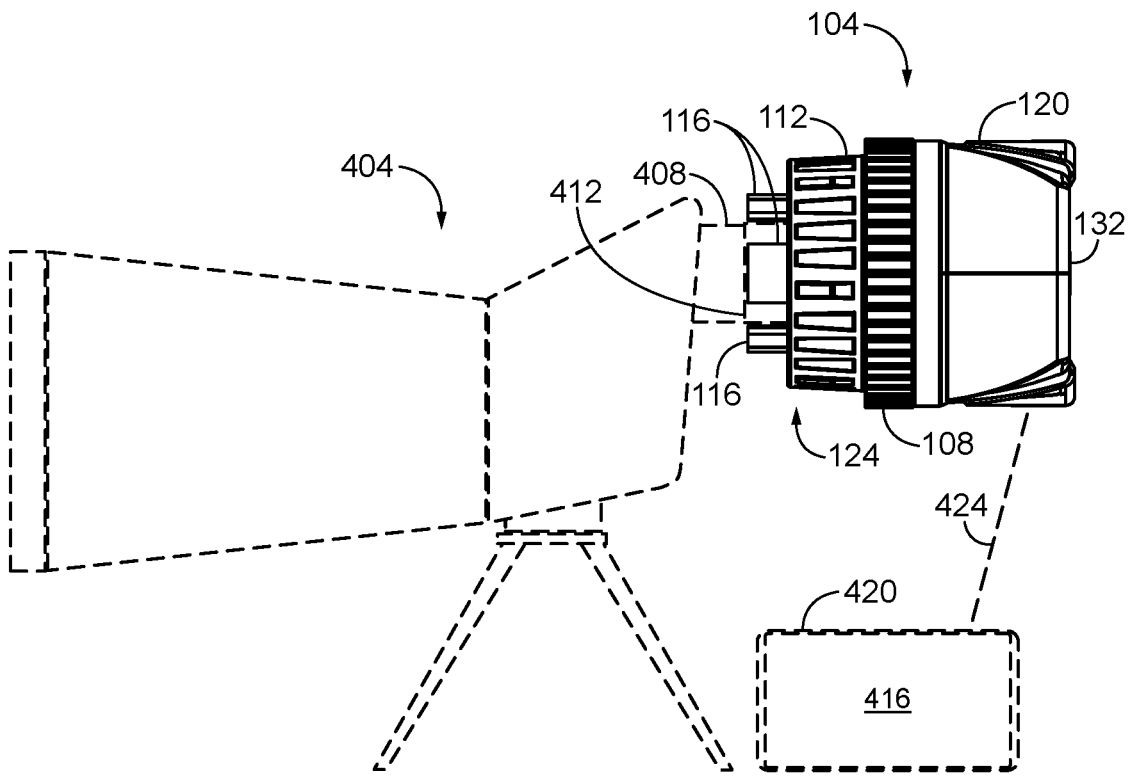
FIG. 4 is a side view of an exemplary viewing device in an environment of use.

FIG. 4 illustrates an exemplary viewing device 104 attached to a spotting scope 404. As can be seen, the self-aligning mount 124 secures the viewing device 104 to an eyepiece 408 of the spotting scope 404. In addition, it can be seen that the eyepiece 408 is secured at a centered position relative to the viewing device 104. As described above, this automatically aligns the eyepiece 408 and the viewing device 104 and its imaging device. Though described with respect to an eyepiece 408, it will be understood that a viewing device 104 may be secured in a centered or otherwise aligned position relative to a lens or other optical element of a spotting scope 404, such as via a self-aligning mount 124.

One or more jaws 116 may engage a magnification ring 412 or other adjustment mechanism of a spotting scope 404 when a viewing device 104 is attached to the spotting scope, such as shown in FIG. 4. In this example, the magnification ring 412 may be rotated to adjust the magnification of the spotting scope 404. As such, once the magnification ring 412 is engaged, the magnification of the spotting scope may be adjusted via an adjustment ring 108, such as by rotating the adjustment ring until the desired magnification is achieved. In this manner, the magnification or other optical setting of a spotting scope 404 can be adjusted even after a viewing device 104 is attached thereto.

In addition, the orientation of the housing 120, viewfinder (if provided), or both can be adjusted as well after the viewing device 104 has been attached, such as by rotating the housing. This is advantageous in that it allows a user to both adjust the magnification of a spotting scope 404 and select a desirable angle or orientation for a viewfinder and the images it presents, even after the viewing device 104 has been attached.

It is noted that, as alluded to above, in some embodiments, one or more jaws 116 may alternatively engage a focusing ring or other adjustment mechanism that adjusts the focus or other adjustable optical setting of a spotting scope. Accordingly, the viewing device 104 is not limited to adjustment of the magnification of a spotting scope.

FIG. 4 also illustrates an exemplary remote display device 420 at which images captured by a viewing device 104 may be viewed. Typically, a remote display device 420 will be remote in the sense that it is not part of the viewing device 104 and may be moved relative thereto. In such manner, a remote display device 420 can be positioned and moved apart from a viewing device 104 and the spotting scope 404 to which the viewing device is attached to allow a user to more easily view images from the spotting scope at the user's current location and position. In one or more embodiments, a remote display device 420 may be a portable device with a screen 416 for presentation of images.

Some exemplary remote display devices 420 include smartphones, tablets, laptops, media players, gaming devices, monitors, or other devices comprising a screen 416. As will be described further below, images and other information may be communicated between a viewing device 104 and one or more display devices 420 via one or more wired or wireless communication links 424. For example, communication links may utilize ETHERNET, USB, HDMI, WIFI, BLUTOOTH, ZIGBEE, or other wired or wireless communication technology. After receipt, one or more images (including in video formats) may be presented at a display device 420. It is noted that, in some embodiments, a viewing device 104 need not have its own viewfinder because one or more remote display devices may be used in lieu of the same.

Figure 5:
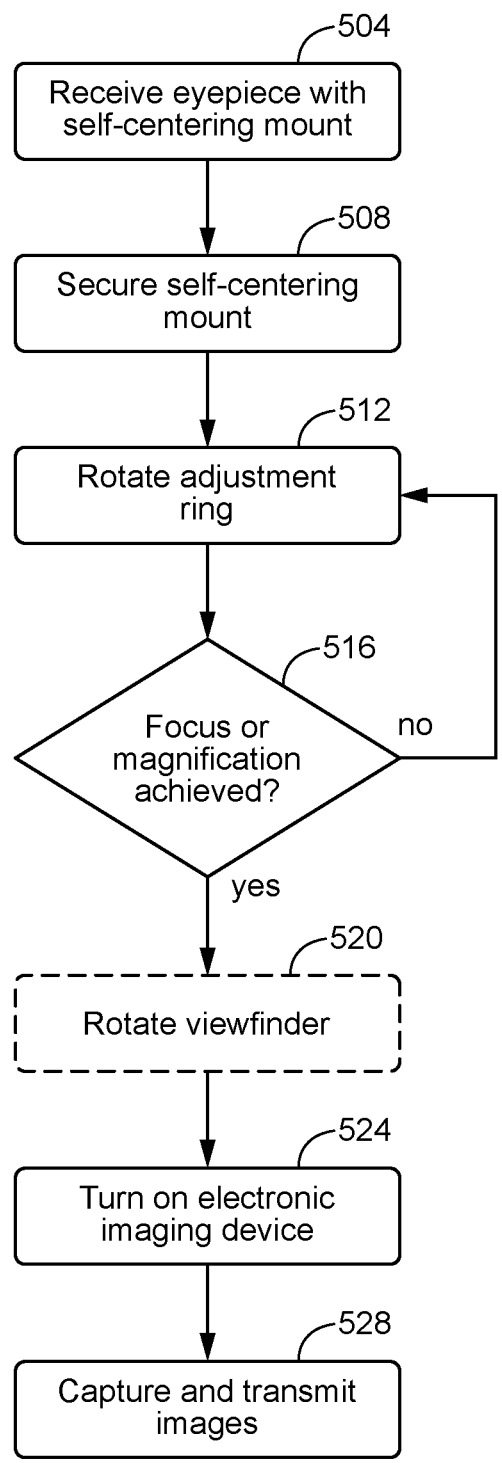
FIG. 5 is a flow diagram illustrating installation of an exemplary viewing device.

FIG. 5 is a flow diagram illustrating attachment and operation of an exemplary viewing device. Though described in a particular sequence, it is contemplated that various steps may occur according to distinct sequences. For example, rotation of an adjustment ring may occur before or after rotation of a viewfinder. As another example, activation or turning on of a viewing device and capture and transmission of images may begin before any of the steps described below.

At a step 504, an eyepiece or the like of a spotting scope may be received or otherwise engaged by a self-aligning mount 504 of the viewing device. At a step 508, the self-aligning mount may be secured to the spotting scope, such as by tightening the jaws thereof through rotation of a mounting ring.

As stated, the self-aligning mount automatically will typically align the viewing device with optical elements of the spotting scope as it is secured to the spotting scope. This is advantageous in that it allows a user to attach the viewing device for use quickly and easily while ensuring that clear images can be captured from the spotting scope.

At a step 512, an adjustment ring of the viewing device may be rotated to adjust the magnification, focus, or other optical setting of the spotting scope. As described above, rotation of the adjustment ring operates a magnification ring or other adjustment mechanism of the spotting scope by virtue of a mechanical connection or engagement with the adjustment ring, such as may be provided via the structure of and engagement by a self-aligning mount. The adjustment ring may be rotated until the spotting scope is at the desired magnification, focus, or other optical setting. The desired optical setting of a spotting scope may be verified through a remote display device or viewfinder. If needed, further adjustment may occur until a desired optical setting is achieved.

Once a desired optical setting is achieved, a viewfinder of the viewing device may be positioned at a step 520. For example, after attachment of the viewing device, the viewfinder may be oriented upside down or at another angle not conducive to or desirable for use. As such, the viewfinder may be rotated, such as by rotating the viewfinder itself, its housing, or both to an upright orientation or angle or other orientation or angle where a user can peer through the viewfinder as desired. It is noted that step 520 need not occur if no viewfinder adjustment is desired, if no viewfinder is provided, or if the user intends to view images via an external or other remote display device. As noted above, a viewfinder need not be provided in all embodiments. Step 520 is accordingly optional and need not occur in embodiments without a viewfinder.

At a step 524, the viewing device may be turned on or otherwise activated, such that it can being capturing images form the spotting scope. This may occur by actuating or engaging one or more buttons or other input devices. It is contemplated that a viewing device may be remotely activated via an infrared or radiofrequency signal, such as from a remote control, remote display device, or other external device. Such device may activate a viewing device via an input device, such as a touch screen, button, or switch thereof.

At a step 528, an imaging device of the viewing device may capture images from the spotting scope. The images may be transmitted via a communication device to an external device, such as a remote display device, for viewing or may be viewed via a viewfinder. It is contemplated that the images may be stored by the viewing device, an external device, or both in some embodiments. Though described primarily with reference to images, it will be understood that images or video (including audio) may be captured and transmitted by a viewing device.

Transmission of images allows users to view images from a spotting scope without physically peering through the spotting scope. For example, a user can view the images on a remote display device, such as described above. In this manner, users can simply use a remote display device rather than positioning themselves to peer through the spotting scope. This is advantageous for users that are participating in an activity that utilizes a spotting scope since users need not disrupt such activity to peer through the spotting scope.

For instance, a user firing a rifle can view and verify bullet impacts by glancing at a remote display device while maintaining their current location and positioning. In addition, images from a single spotting scope can be transmitted to multiple remote display devices to allow multiple users to view the images simultaneously, without peering through the spotting scope itself. In addition, a single user can move, magnify or focus, or otherwise adjust and operate a spotting scope for multiple users. The viewing device also allows a spotting scope to be more freely positioned in that a user need not consider the ease or difficulty of accessing the spotting scope once it is set up.

Figure 6:
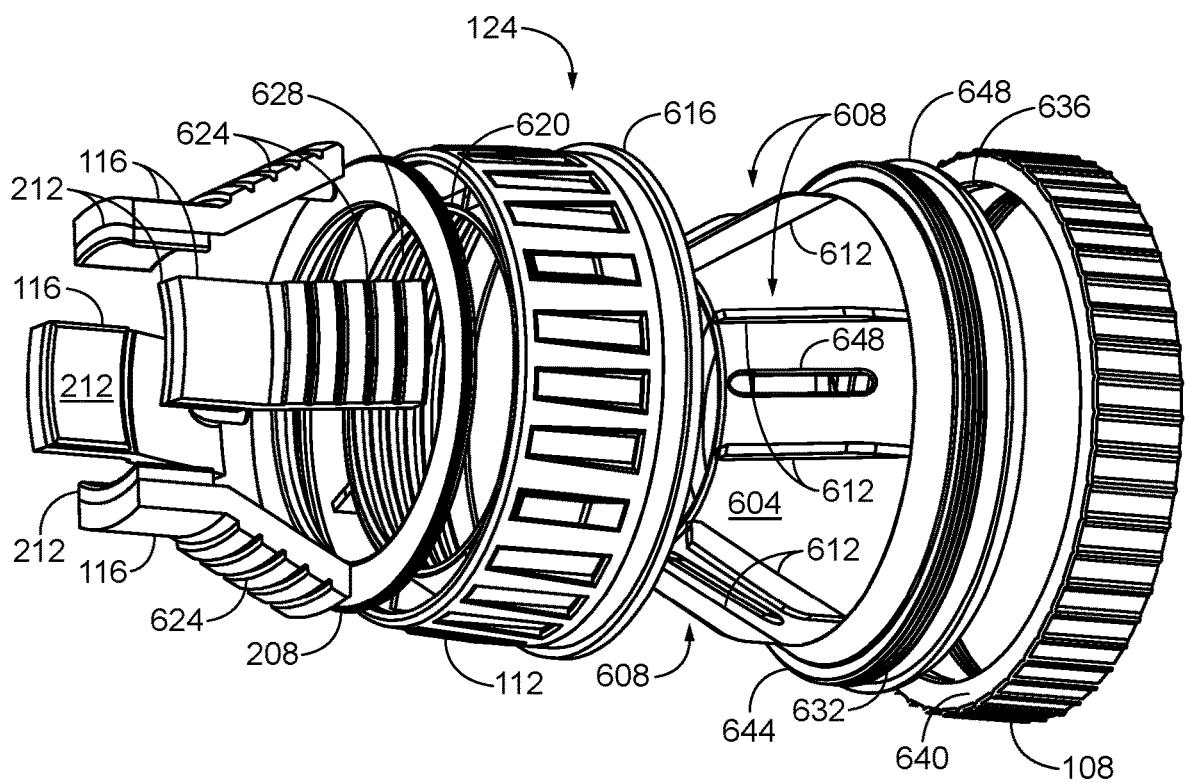
FIG. 6 is an exploded perspective view of an exemplary self-aligning mount and adjustment ring.
Figure 7:
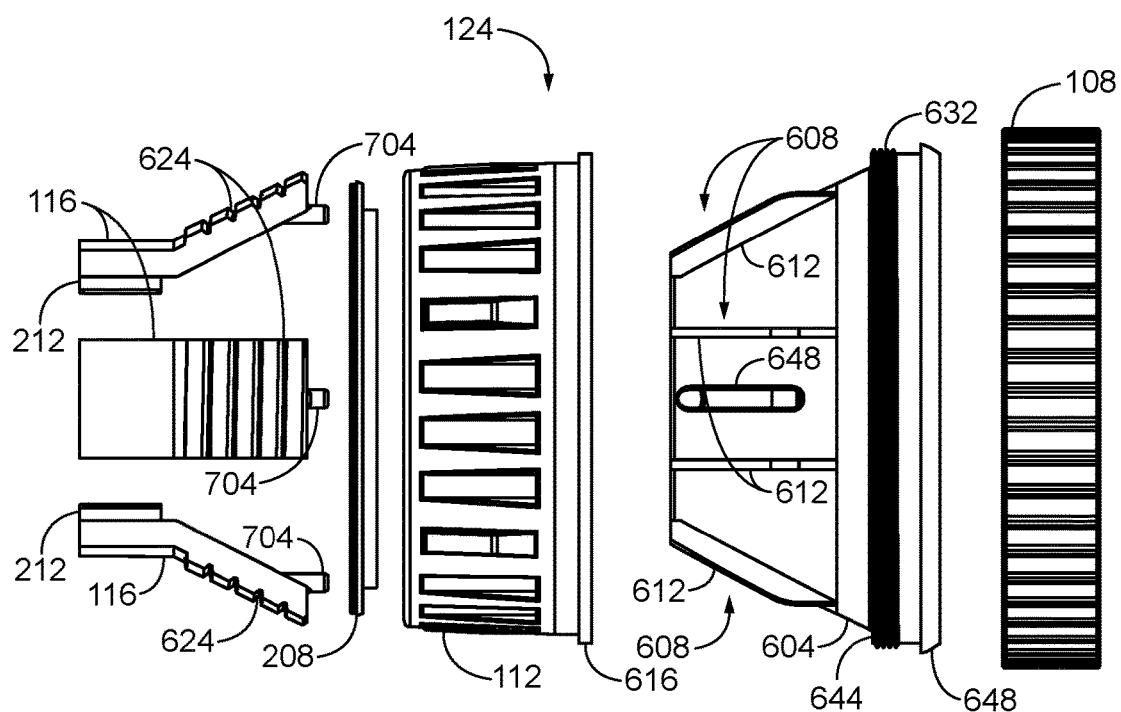
FIG. 7 is an exploded side view of an exemplary self-aligning mount and adjustment ring.

Further detail regarding a self-aligning mount 124 and adjustment ring 108 will now be provided with regard to FIGS. 6 and 7. FIGS. 6 and 7 respectively illustrate perspective and side exploded views of the same.

As described above, jaws 116 of a self-aligning mount 124 will typically move in conjunction with one another to provide the self-centering capabilities described herein. In one or more embodiments, one or more jaws 116 may move along a tapering or narrowing path in a synchronized manner. As shown in FIGS. 6 and 7 for instance, one or more guides, such as one or more tracks 608, may be provided to guide one or more jaws 116 along such a path.

Each track 608 may taper or narrow toward one another such that, when moved in a closing direction, the jaws 116 move toward one another. Moving in an opposite opening direction causes the jaws 116 to move apart. In the embodiment of FIGS. 6 and 7, the tracks 608 are mounted to a track support 604 to achieve the same. For instance, a track support 604 may have a tapered shape, such as the conical shape as shown.

A track 608 may be formed in various ways. As shown, a track 608 comprises walls 612 that receive a jaw 116 track 608 therebetween. In this manner, the jaw 116 is guided along the path of the track 608 when moved. In addition or alternatively, a slot 648 may be provided to guide a jaw 116 by receiving a corresponding member or tab 704 of the jaw therein. Other mechanisms may be used as well.

Synchronization of the movement of individual jaws 116 will typically be accomplished by moving the jaws simultaneously at the same rate. In the embodiment of FIGS. 6 and 7, a control thread 628 is provided to such end. As can be seen, the control thread 628 may be mounted within a mounting ring 112 such that it possesses the same axis of rotation. In this manner, rotation of the mounting ring 112 also rotates the control thread 628.

A control thread 628 will also typically be tapered to correspond to the taper or angle of the tracks 608. For example, a control thread 628 may be formed on a tapered or conical thread support 620. When the mounting ring 112 and track support 604 are assembled, individual jaws 116 engage the tracks 608 of the track support as well as the control thread 628. The taper or shape of the control thread 628 allows the jaws 116 to maintain engagement therewith as the jaws move along the tracks 608.

Engagement of the control thread 628 may be accomplished via one or more grooves 624 formed the jaws 116, such as shown. The grooves 624 may be angled to match the pitch of the control thread 628. When the mounting ring 112 and control thread 628 is rotated, the pitch of the control thread 628 in connection with the control thread's engagement of the jaws' grooves 624 causes the jaws 116 to move simultaneously along the tracks 608 at the same rate. It is contemplated that, a jaw 116 may comprise a tooth, ridge, tab, or other protrusion rather than a groove 624. In such an embodiment, the jaw 116 would engage a groove rather than a ridge of a control thread 628.

As shown and described with respect to FIG. 4, the mounting ring 112 may be rotated until the jaws 116 close to secure an eyepiece 408 or other portion of a spotting scope 404. Rotating the mounting ring 112 in the opposite direction opens the jaws 116 by moving them apart via the control thread 628, and allows the viewing device 104 to be removed from the spotting scope 404

Referring to FIGS. 6 and 7, a jaw 116 may comprise an angled structure in one or more embodiments. For example, a distal end of a jaw 116 may be angled relative to the remainder of the jaw, as shown. In one or more embodiments, the angle will be such that the distal end is parallel to the axis of the viewing device's imaging device. In such manner, the jaws 116 of a self-aligning mount 124 align a spotting scope to the imaging device automatically.

As alluded to above, a mounting ring 112 is rotatable relative to a track support 604 but must remain secured thereto to maintain a self-aligning mount 124 in an assembled state. A base 616 of a mounting ring 112 may engage a ledge 644 of a track support 604 when assembled. The mating surfaces thereof move relative to one another when the mounting ring 112 is rotated relative to the track support 604. This helps to ensure that the axis of the mounting ring's rotation is aligned with the axis of the track support 604 when rotated.

To maintain engagement of the mounting ring 112 and track support 604 at their respective base 616 and ledge 644 when assembled, a retaining structure may be installed. As can be seen from FIG. 6 a retaining ring 640 may be secured to hold the base 616 and ledge 644 in engagement with one another once assembled. For example, a retaining ring 640 may be threaded onto a track support 604 via an assembly thread 632.

The retaining ring 640 is shown as part of an adjustment ring 108 in the embodiment of FIGS. 6 and 7 and therefore the adjustment ring and retainer ring are secured to the track support 604 simultaneously via the assembly thread 632. It is contemplated that a retainer ring 640 may be an independent component in some embodiments however.

An adjustment ring 108 will typically be fixedly attached to a track support 604 such that rotation of the adjustment ring rotates the self-aligning mount 124 and jaws 116 thereof. This allows adjustment of a spotting scope's magnification ring or other adjustment mechanism via rotation of the adjustment ring 108. The adjustment ring 108 and jaws 116 have a mechanical connection, through which the jaws may be rotated via the adjustment ring, once the adjustment ring is attached to the track support 604.

Figure 8:
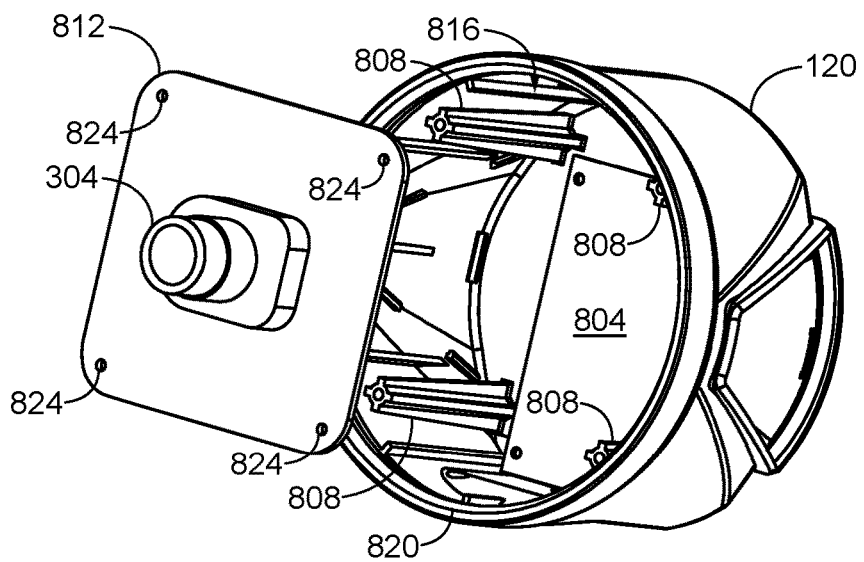
FIG. 8 is an exploded perspective view of an exemplary housing and components therein.

One or more barbs 648 or other fasteners may be at an end of a track support 604 to attach to a housing. A rotating mount may be formed by such connection, as will now be described with regard to FIGS. 8 and 9. FIG. 8 illustrates, among other things, an exploded perspective view of a housing 120 and components thereof. As can be seen, one or more grooves 820 may be formed in a housing 120 to receive one or more barbs 648.

Figure 9:
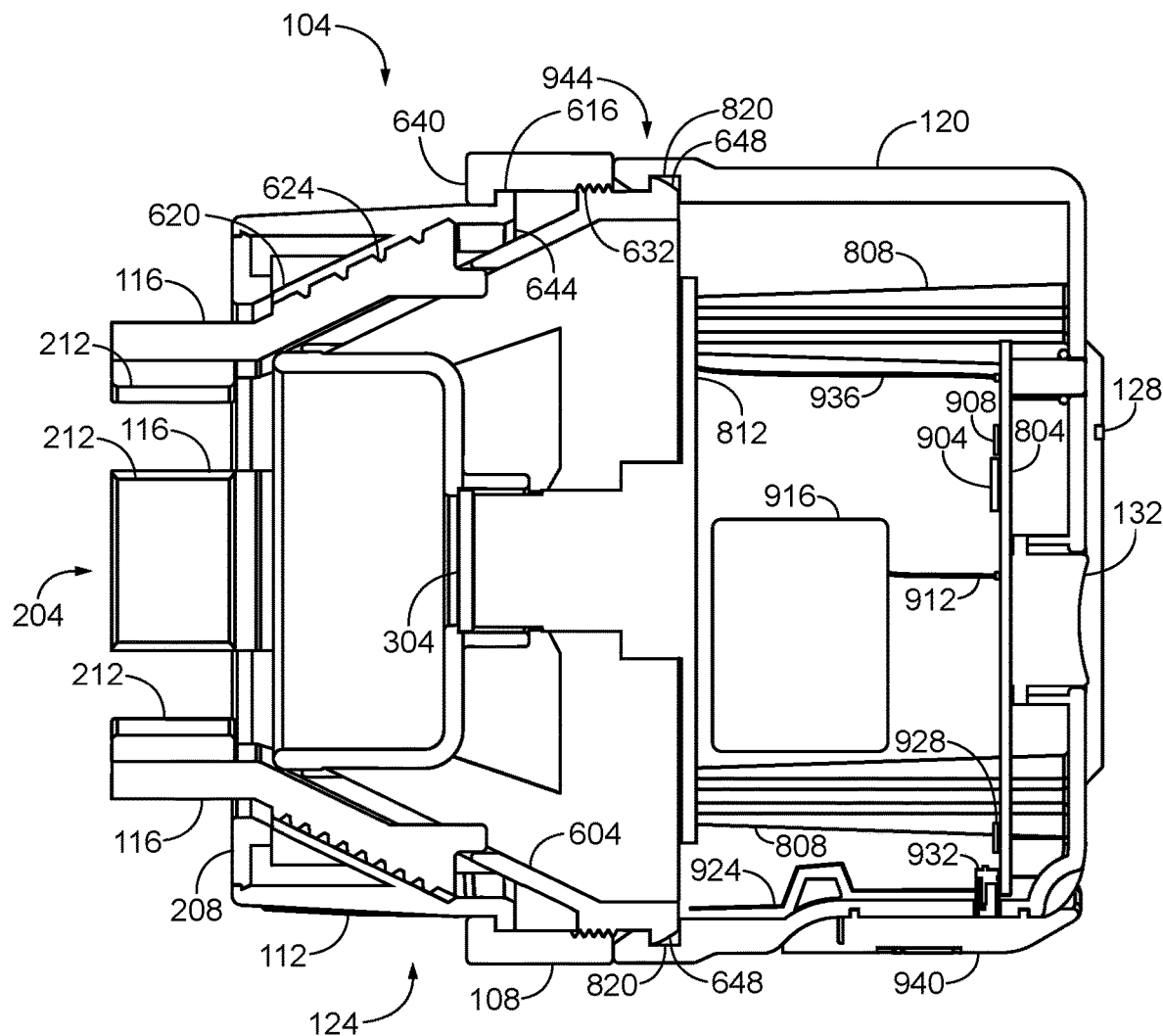
FIG. 9 is a side cross sectional view of an exemplary viewing device.

FIG. 9 illustrates a side cross sectional view of an exemplary viewing device 104 in an assembled state. Further detail regarding the rotating mount 944 are illustrated. In general, a rotating mount 944 will rotatably attach a housing 120 to a self-aligning mount 124, such as via its track support 604. In one or more embodiments, a rotating mount 944 may comprise one or more barbs 648 that are received in one or more grooves 820. A barb 648 may be part of a track support 604 and a groove 820 may be part of a housing 120, or vice versa.

As can be seen, a barb 648 and groove 820 secure the track support 604 to the housing 120. As shown, the barb 648 and the groove 820 are annular structures that, respectively, extend around the periphery of the track support 604 and housing 120, such as can be seen from FIGS. 7 and 8. This allows a track support 604 and self-aligning mount 124 to be rotated relative to a housing 120 such as via rotation of an adjustment ring 108.

A barb 648 may comprise an angled portion to aid in assembly. An edge or rim of the housing 120 may have a tapered or barbed shape as well, such as shown. The angled shapes aid in a snap fit attachment of the track support 604 to the housing 120 during assembly. Though shown as a tapered "barb" it is contemplated that a rectangular or tab or other protruding shape may be used in some embodiments. In addition, individual discrete barbs 648 may be provided in some embodiments. It is contemplated that a groove 820 may only extend a portion of a housing's periphery in some embodiments, such as to limit the amount of rotation. In other words, a rotating mount 944 may have a limited range of motion in some embodiments.

FIGS. 8 and 9 also illustrate various electronic components which may be enclosed or supported by a housing 120. For example, an imaging device 304 or circuit board 804 may be secured to a housing 120 or various supports thereof, such as shown. As shown, the imaging device 304 is supported by a mounting plate 812 that may be attached to a housing 120 via one or more standoffs 808 or other supports. Various holes 824 may be provided for installation of one or more mechanical fasteners. Alternatively or in addition, various welds, adhesives, or other bonds may be used to attach components of a viewing device.

As shown in FIG. 9, a viewing device may comprise one or more imaging devices 304, processors 904, storage devices 908, and communication devices 928. In addition, a viewing device may comprise one or more power supplies 916 and communication ports 932.

An imaging device 304 will typically capture images including the visible light spectrum, but may also or alternatively capture images using infrared or other electromagnetic spectrums. As noted above, though described herein as capturing images, it will be understood that video or still images can be captured and used by a viewing device. In some embodiments, a microphone may be provided to capture audio as well.

A processor 904 may be a microprocessor, integrated circuit, microcontroller, ASIC, FPGA, or other electronic circuitry. In one or more embodiments, a processor 904 will execute instructions to provide the functionality disclosed herein. For example, a processor 904 may facilitate network, peer to peer, or other communication with external devices, such as to communicate images to one or more remote display devices. A processor 904 may also compress images prior to storage or transmission, provide access control or user authentication to remote display devices, or the like.

The instructions may be integrated into or stored in the processor 904 or stored on a storage device 908 for retrieval and execution. It is contemplated that a storage device 908 may also or alternatively store images captured by an imaging device 304. A storage device 908 will typically store data on a non-transient storage medium, excluding carrier waves or signaling. For example, a storage device 908 may store data on flash, magnetic, optical or other non-transient storage medium.

A communication device 928 may communicate via one or more wired or wireless connections. For example, communication may occur via ETHERNET, USB, HDMI, optical, or other wired connection via one or more communication ports 932. In such cases, a communication device 928 may be a wired signal transmitter, receiver, or both. Alternatively or in addition, communication may occur via WIFI, BLUETOOTH, ZIGBEE, or other wireless connection via one or more antennas 924. In such cases, a communication device 928 may comprise a radiofrequency transmitter, transceiver, or the like.

In operation, a communication device 928 will typically transmit images to one or more remove display devices to provide a view through a spotting scope at such remote display devices. Other information may be communicated as well, such as system status information, commands, user authentication credentials, and configuration settings.

As its name implies, a power supply 916 provides power to operate a viewing device 104. A power supply 916 may comprise one or more batteries in some embodiments. In addition, a power supply 916 may be a power adapter or driver. A power supply 916 will typically also be capable of receiving power from an external source, such as to recharge one or more batteries or directly power a viewing device 104. It is contemplated that a communication port 932 or separate port may be used to receive power in some embodiments.

The various electronic components, such as described above, may be connected via circuit traces of a circuit board 804, such as in a bus, hub, hybrid, or other topology. In addition, as can be seen, one or more electrical (or optical) cable connections 912 may be used to connect electronic components to one another.

Figure 10:
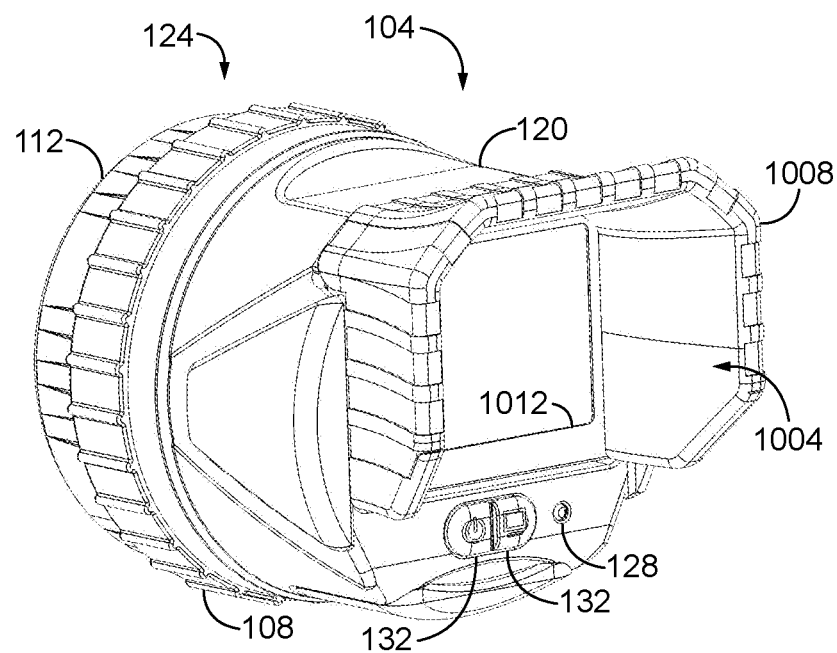
FIG. 10 is a rear perspective view of an exemplary viewing device.

FIG. 10 illustrates a rear perspective view of another exemplary embodiment of a viewing device 104 having a viewfinder 1004 comprising an externally mounted display 1012. As can be seen, such display 1012 is directly viewable and may be covered by a hood 1008, such as to reduce glare or excessive external light.

A display 1012 may present images captured by an imaging device 304 or stored on a storage device 908 to a user, such as via a viewfinder 1004. A display 1012 may also display system status information, such as battery level, available storage space, communication device status, or the like. Some exemplary displays 1012 include, LCD or OLED screens. A display 1012 may be covered or enclosed by a transparent window or panel. In one or more embodiments, such transparent window or panel may be a lens, such as to magnify the view of the display 1012.

A display 1012 need not be provided in all embodiments. For instance, a viewfinder 1004 may be an optical, rather than electronic, viewfinder comprising one or more lenses, optical splitters, mirrors, or other optical componentry to provide a view through a spotting scope. Alternatively, the screens of one or more remote display devices may be used in lieu of a display 1012 integrated into a viewing device 104.

In addition, FIG. 10 illustrates exemplary input devices 132 for activating and deactivating (i.e., turning on and off) a viewing device 104 and toggling between presentation of images on the integrated display 1012 and one or more remote display devices. In this case, the input devices 132 are buttons. The display 1012 can be deactivated by engaging such input device 132, such as to save power when the display is not in use.

Figure 11:
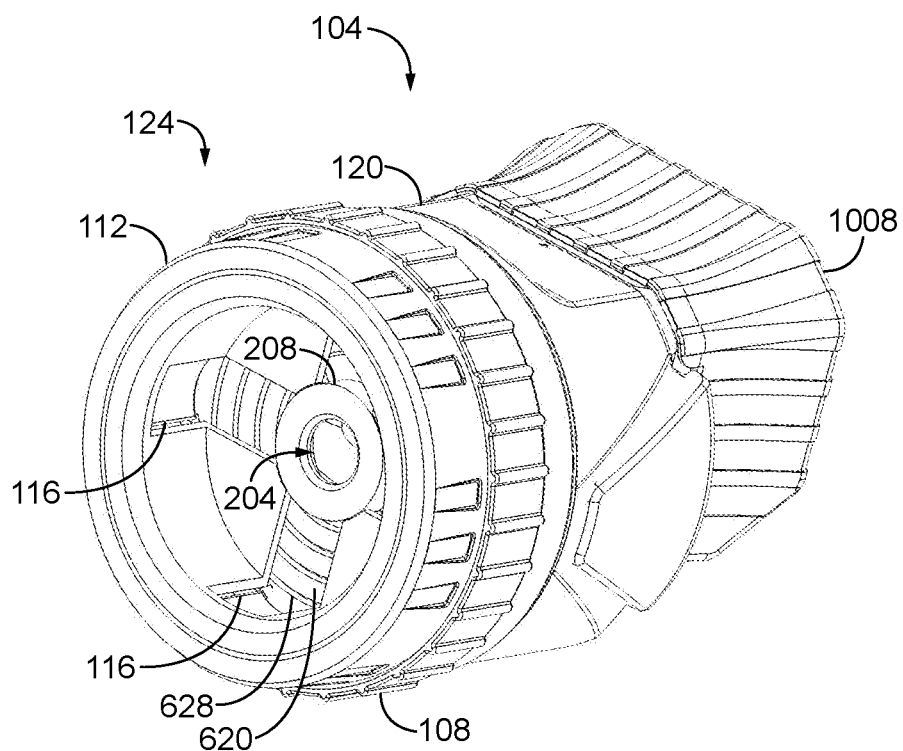
FIG. 11 is a front perspective view of an exemplary viewing device.
Figure 12:
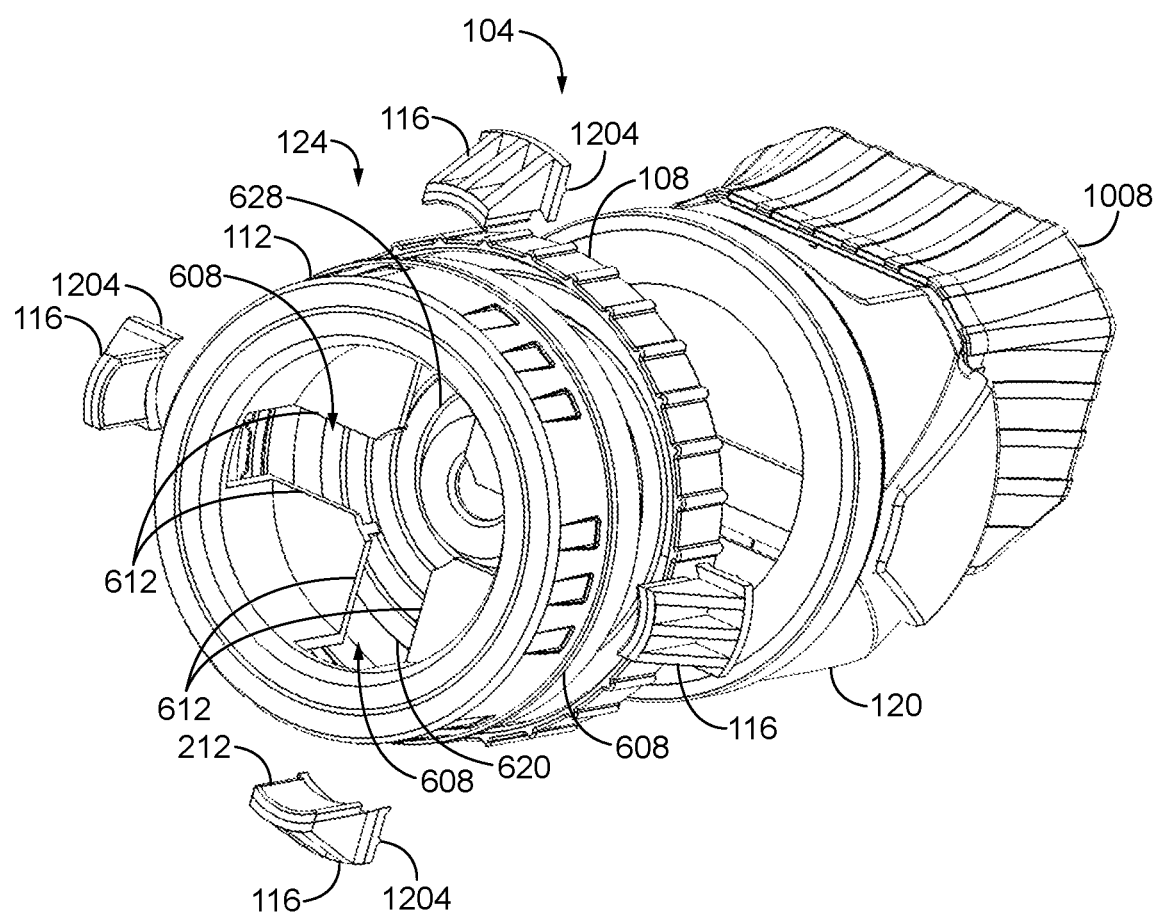
FIG. 12 is an exploded perspective view of an exemplary viewing device.

FIGS. 11 and 12 illustrate a front perspective view and exploded perspective view of another exemplary embodiment of a self-aligning mount 124. Similar to above, a mounting ring 112 may be rotated to open and close the jaws 116 of the self-aligning mount 124. In this embodiment, a plurality of jaws 116 may be moved in conjunction with one another via a planar control thread 628. As can be seen, the control thread 628 may be supported by a planar thread support 620. In this embodiment, the thread support 620 is part of an adjustment ring 108.

A jaw 116 may comprise one or more teeth 1204, ridges, tabs or other protrusions that engage a groove of a control thread 628. Similar to above, such protrusion may share the same pitch as its corresponding control thread 628. In addition, one or more tracks 608 may be provided to guide the movement of each jaw 116. This may be accomplished by one or more walls 612 or other structures that guide the movement of a jaw 116.

When the mounting ring 112 is rotated, the tracks 608 rotate, carrying the jaws 116 therein. A tooth 120 of the jaws 116 engage and follow spiral of the control thread 628 thereby opening or closing the jaws in a synchronized fashion. As described above, jaws 116 are moved at the same rate to maintain a center point therebetween, allowing the self-aligning mount 124 to automatically center a viewing device 104 relative to a spotting scope.

Also similar to above, each jaw 116 may have an angled distal end. As shown for instance, the distal ends are substantially perpendicular to the remainder of each jaw. The angle may be selected to secure a viewing device perpendicular to its imaging device's axis such that when secured to a spotting scope, the view through the scope is properly directed at the imaging device. The adjustment ring 108 may be rotated to adjust a magnification ring or other adjustment mechanism of a spotting scope to achieve the desired magnification, and the housing 120 may be rotated to orient the display 1012 thereof, even after the viewing device is attached to the spotting scope, such as described above. As described above, the adjustment ring 108 may also or alternatively be used to adjust the focus or other setting of a spotting scope.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. A viewing device for an optical device comprising one or more optical elements, the viewing device comprising:
    an imaging device that captures one or more images;
    a mount that secures the viewing device to the optical device, wherein, when secured to the optical device by the mount, the imaging device is aligned with the one or more optical elements;
    an adjustment control coupled with at least a portion of the optical device via the mount, wherein movement of the adjustment control mechanically changes an optical setting of the optical device via the coupling; and
    a communication device that transmits the one or more images captured by the imaging device to one or more remote devices, wherein the one or more images are captured by the imaging device using the one or more optical elements;
    wherein the mount comprises a plurality of jaws that open and close in a synchronized manner, each of the plurality of jaws being a planar structure having a distal section aligned coaxially with the viewing device and a proximal section angled non-coaxially with the viewing device such that only the distal section engages the optical device when the viewing device is secured to the optical device.

2. The viewing device of claim 1, further comprising a viewfinder that presents the one or more images at the viewing device.

3. The viewing device of claim 2, wherein the viewfinder is rotatable independent of the imaging device.

4. The viewing device of claim 1, wherein the adjustment control is a ring.

5. The viewing device of claim 1, further comprising a mounting control, wherein operation of the mounting control opens or closes the plurality of jaws.

6. The viewing device of claim 1, further comprising one or more tapered supports, wherein the plurality of jaws move along the one or more tapered supports when opening and closing.

7. A viewing device for an optical device comprising one or more optical elements, the viewing device comprising:
    an imaging device that captures one or more images;
    a mount that secures the viewing device to the optical device, wherein, when secured to the optical device by the mount, the imaging device is aligned with the one or more optical elements;
    a rotatable viewfinder;
    an adjustment control coupled with at least a portion of the optical device via the mount, wherein movement of the adjustment control mechanically changes an optical setting of the optical device via the coupling; and
    a communication device that transmits the one or more images captured by the imaging device to one or more remote devices, wherein the one or more images are captured by the imaging device using the one or more optical elements;
    wherein the mount comprises a plurality of jaws that open and close in a synchronized manner, each of the plurality of jaws being a planar structure having a distal section aligned coaxially with the viewing device and a proximal section angled non-coaxially with the viewing device such that only the distal section engages the optical device when the viewing device is secured to the optical device.

8. The viewing device of claim 7, wherein the adjustment control is coupled to the at least a portion of the optical device via the mount.

9. The viewing device of claim 7, wherein the adjustment control is a ring that is operated by rotation thereof.

10. The viewing device of claim 7, further comprising a mounting control, wherein operation of the mounting control opens or closes the plurality of jaws.

11. The viewing device of claim 7, further comprising one or more tapered supports, wherein the plurality of jaws move along the one or more tapered supports when opening and closing.

12. A method for providing imaging from an optical device comprising one or more optical elements with a viewing device, the method comprising:

securing the viewing device to the optical device with a mount, wherein an imaging device of the viewing device is aligned with the one or more optical elements and an adjustment control of the viewing device is coupled with at least a portion of the optical device via the mount when the viewing device is secured to the optical device;

capturing one or more images with the imaging device, wherein the one or more images are captured by the imaging device using the one or more optical elements; and mechanically adjusting an optical setting of the optical device when the adjustment control is moved via the coupling between the adjustment control and the at least a portion of the optical device; and transmitting the one or more images to one or more remote devices with one or more communication devices of the viewing device;

wherein the mount comprises a plurality of jaws that open and close in a synchronized manner, each of the plurality of jaws being a planar structure having a distal section aligned coaxially with the viewing device and a proximal section angled non-coaxially with the viewing device such that only the distal section engages the optical device when the viewing device is secured to the optical device.

13. The method of claim 12, further comprising presenting the one or more images at a viewfinder.

14. The method of claim 13, wherein the viewfinder is rotatable independent of the imaging device.

15. The method of claim 12, wherein the plurality of jaws move along one or more tapered supports when opening and closing.

* * * * *